(12) United States Patent
Heid

(10) Patent No.: US 9,698,698 B2
(45) Date of Patent: Jul. 4, 2017

(54) ARRANGEMENT FOR IGNITING THIN RODS COMPOSED OF ELECTRICALLY CONDUCTIVE MATERIAL, IN PARTICULAR THIN SILICON RODS

(71) Applicant: Siemens Aktiengesellschaft, Munich (DE)

(72) Inventor: Günter Heid, Rutesheim (DE)

(73) Assignee: Siemens Aktiengesellschaft, Munich (DE)

( * ) Notice: Subject to any disclaimer, the term of this patent is extended or adjusted under 35 U.S.C. 154(b) by 436 days.

(21) Appl. No.: 14/172,231

(22) Filed: Feb. 4, 2014

(65) Prior Publication Data

US 2014/0217819 A1    Aug. 7, 2014

(30) Foreign Application Priority Data

Feb. 6, 2013    (EP) ..................................... 13154201

(51) Int. Cl.
*H02M 5/10* (2006.01)
*H01F 29/02* (2006.01)

(52) U.S. Cl.
CPC .............. *H02M 5/10* (2013.01); *H01F 29/02* (2013.01); *Y10T 307/297* (2015.04)

(58) Field of Classification Search
CPC ...................................................... H01F 29/02
USPC ............................................................ 307/17
See application file for complete search history.

(56) References Cited

U.S. PATENT DOCUMENTS

| | | | |
|---|---|---|---|
| 3,941,900 A * | 3/1976 | Stut .......................... | C23C 16/46 117/84 |
| 4,493,016 A * | 1/1985 | Cham ..................... | H01F 30/12 336/215 |
| 4,672,298 A * | 6/1987 | Rohatyn ................... | G05F 1/70 323/208 |
| 4,723,104 A * | 2/1988 | Rohatyn ............. | H02P 29/0038 174/DIG. 16 |
| 6,351,106 B1 | 2/2002 | Kramer et al. | |
| 8,330,302 B2 | 12/2012 | Wallmeier et al. | |
| 2003/0197989 A1* | 10/2003 | Nojima ..................... | B60L 3/00 361/47 |
| 2006/0126242 A1* | 6/2006 | Datta ...................... | H02M 7/49 361/62 |
| 2009/0295361 A1 | 12/2009 | Ellinger et al. | |
| 2010/0231039 A1* | 9/2010 | Wallmeier ............ | C01B 33/035 307/17 |

(Continued)

FOREIGN PATENT DOCUMENTS

EP    2 133 983    12/2009
EP    2 234 259    9/2010

*Primary Examiner* — Adi Amrany
(74) *Attorney, Agent, or Firm* — Cozen O'Connor

(57) ABSTRACT

A circuit arrangement for igniting thin rods composed of electrically conductive material at are thin silicon rods, wherein a three-phase AC system forming a three-phase system is used to feed electrical energy to the thin rods, wherein the three-phase AC system forms the three-phase system or a three-phase transformer having a secondary-side three-phase winding system forms the three-phase system, and wherein the three phases of the three-phase system or of the secondary-side three-phase winding system are interconnected or controlled such that voltages comprising voltage vectors of the three phases cancel one another out in a three-phase closed vector triangle system.

5 Claims, 5 Drawing Sheets

(56) References Cited

U.S. PATENT DOCUMENTS

| | | | | |
|---|---|---|---|---|
| 2011/0169332 A1* | 7/2011 | Wallmeier | ............... | H02M 5/22 |
| | | | | 307/31 |
| 2013/0020869 A1* | 1/2013 | Wallmeier | ............... | H02M 5/16 |
| | | | | 307/18 |
| 2013/0027019 A1* | 1/2013 | Paul | ......................... | H01F 27/42 |
| | | | | 323/361 |
| 2013/0323136 A1* | 12/2013 | Averberg | ........... | H02M 3/33569 |
| | | | | 422/199 |
| 2013/0323137 A1* | 12/2013 | Averberg | ............... | B01J 8/0285 |
| | | | | 422/199 |

* cited by examiner

FIG 4
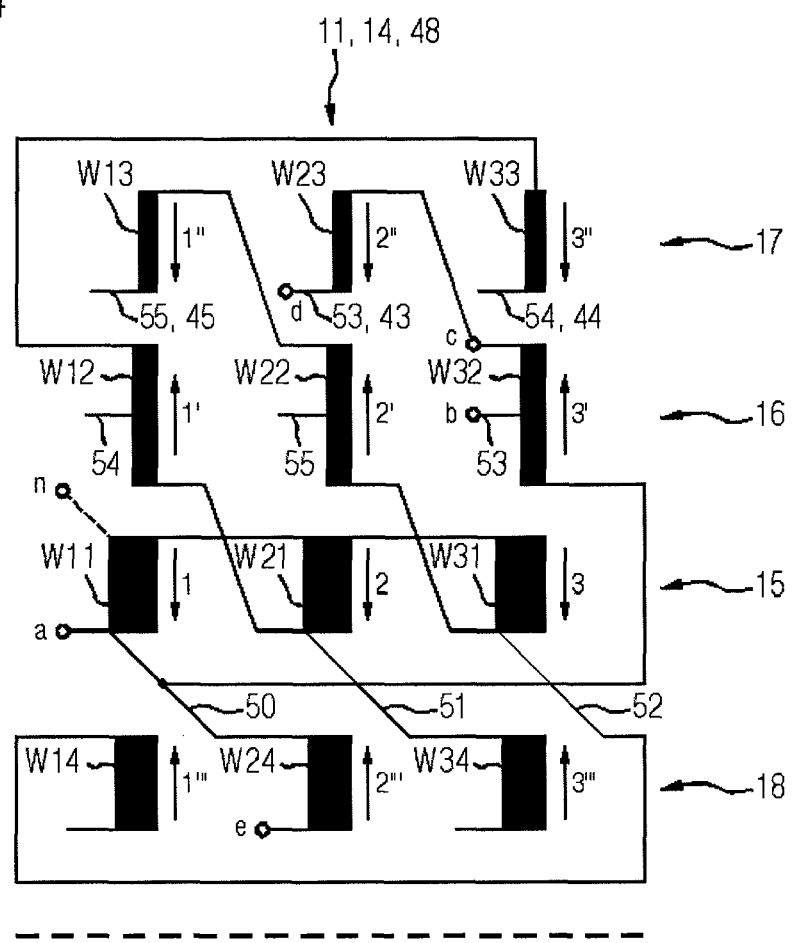
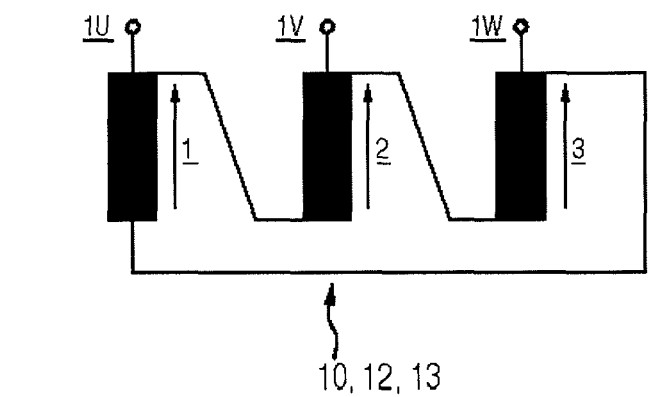

ARRANGEMENT FOR IGNITING THIN RODS COMPOSED OF ELECTRICALLY CONDUCTIVE MATERIAL, IN PARTICULAR THIN SILICON RODS

BACKGROUND OF THE INVENTION

1. Field of the Invention

The invention relates to a circuit arrangement for igniting thin rods comprising electrically conductive material, i.e., thin silicon rods. The invention also relates to the use of a three-phase AC system (three-phase system) for feeding electrical energy to the thin rods comprising the electrically conductive material, i.e., the thin silicon rods.

2. Description of the Related Art

EP 2 234 259 A1 discloses a circuit arrangement for igniting four thin silicon rods in a reactor for producing silicon rods from the thin silicon rods according to a Siemens process.

In accordance with the known Siemens process, metallurgical silicon is firstly converted to liquid trichlorosilane using gaseous hydrogen chloride at approximately 600K.

The trichlorosilane is then purified in a plurality of distillation steps, where vapor deposition then ensues.

During this vapor deposition, the distillate is caused to boil and is conducted over hot thin silicon rods in deposition reactors, designated just as reactors for short hereinafter. Silicon crystals then grow on these hot or heated thin silicon rods, where the trichlorosilane is decomposed with the aid of hydrogen to form silicon, hydrogen chloride and silicon tetrachloride.

The growth can be begun anywhere on the hot thin silicon rods. As a result, the entire (thin) rods are then not monocrystalline, but rather consist of a plurality of crystals (polycrystalline silicon).

After approximately one week, the (polycrystalline) thin silicon rods have grown to the desired size, i.e., to the silicon rods, and are withdrawn from the reactor or exchanged.

The heating of the thin silicon rods in the reactor is effected electrically, where voltage is supplied or fed to the thin silicon rods.

During a start phase, i.e., ignition of the thin silicon rods and run-up of the reactor, the thin silicon rods are supplied with a medium voltage, which is greater than 2500 V. Ignition of the thin silicon rods can then be achieved with such high voltages.

Once all the thin silicon rods have been ignited, i.e., the start phase has ended, an operating phase ensues, in which the thin silicon rods are supplied with a voltage that is below the voltage in the start phase. In the operating phase, the thin silicon rods are then grown to form the (polycrystalline) silicon rods.

The high voltages required/used for igniting the thin silicon rods introduced in the reactor would require complex insulations in the reactor for the shielding thereof. Accordingly, recourse is had here to specific circuit arrangements in the context of the voltage supply of the thin silicon rods, with thin silicon rods being correspondingly arranged and interconnected in the reactor.

The specific circuit arrangements are based on three-phase or AC/AC voltage systems that are interconnected such that the voltages applied to the thin silicon rods or made available to the thin silicon rods by the circuit arrangement cancel one another out.

EP 2 234 259 A describes one such specific circuit arrangement, via which four thin silicon rods can be ignited. In this, the circuit arrangement therein or the three-phase/AC voltage system therein is interconnected such that the four thin silicon rods are fed from respective single-phase systems with voltages offset by 180° with respect to one another.

What proves to be disadvantageous about these circuit arrangements is that they are only suitable for igniting four (or a multiple of four) or only an even number of thin silicon rods correspondingly arranged relative to one another. In other words, these circuit arrangements are only insufficiently suitable for also igniting a number of other than four (or a multiple thereof) thin silicon rods correspondingly arranged in relation to one another or an odd number of thin silicon rods correspondingly arranged in relation to one another.

A three phase transformer is disclosed in the German version of Wikipedia.

Three-phase transformers, as a specific form of a plurality of combined single-phase transformers, which single-phase transformers set out in their general embodiment to decrease/increase voltage, are used for electrical energy transfer by means of stepped-up three-phase AC current.

In this case, such a three-phase transformer combines the three individual single-phase transformers required for (step-up) transformation in a three-phase system to form a single transformer.

Three-phase transformers are constructed similarly to the single-phase transformers. In contrast to the single-phase transformers, however, here, i.e., in the case of the three-phase transformers, a primary side and secondary side each consist of three separate windings, usually designated by U, V, W for the high-voltage side and u, v, w for the low-voltage side, which are accommodated on a soft-magnetic iron core having three or five legs. Here, the high—voltage windings and low-voltage windings are usually fitted on a respective limb in a manner isolated by corresponding insulation material.

The way in which the (in total) six connections per side (i.e., the primary and secondary sides) of a three-phase transformer are interconnected with one another is determined by a vector group.

Customary interconnections in the vector groups comprise a star and/or delta connection (winding), which in principle can be combined arbitrarily on both sides.

SUMMARY OF THE INVENTION

It is an object of the invention to provide a circuit arrangement for igniting thin silicon rods or thin rods comprising electrically conductive material, where the circuit arrangement makes it possible to ignite thin silicon rods/thin rods in a number of (silicon) thin rods to be ignited that deviates from four rods or an even number of rods, or makes it possible to ignite thin silicon rods or thin rods comprising electrically conductive material in a number that deviates from four rods or an even number of rods.

This and other objects and advantages are achieved in accordance with the invention via the circuit arrangement for igniting thin rods comprising the electrically conductive material, i.e., thin silicon rods, and via use of a three-phase AC system (three-phase system) for feeding electrical energy to the thin rods comprising the electrically conductive material, i.e., the thin silicon rods.

The invention and the developments described have been realized, including in parts, both in software and in hardware, for example, utilizing a specific electrical circuit.

The invention is based on the consideration or insight that within a polyphase or three-phase system, such as a three-phase AC system (three-phase system), the voltages likewise cancel one another out if they are controlled or switched in a suitable form.

It is also an object of the invention to provide a three-phase AC system (three-phase system) that is utilized to feed electrical energy to thin rods comprising the electrically conductive material, i.e., the thin silicon rods, where the three phases of the three-phase system are interconnected or controlled such that voltages (e.g., voltage vectors) of the three phases cancel one another out or at least approximately, i.e., apart from small voltage differences, (vectorially) cancel one another out (voltage difference is "ideally" zero (0V)) (three-phase closed vector triangle).

With the voltages, which mutually cancel one another out, the thin rods comprising the electrically conductive material, i.e., the thin silicon rods, are fed with electrical energy and can thus subsequently be heated and ignited.

In other words, a voltage phasor system of the three-phase system is correspondingly switched or is (vectorially geometrically) closed or is approximately closed ("ideally closed"). Also expressed illustratively, the use thus realizes a "triangle system", the "voltage legs" of which are fed such that the voltage phasors/vectors close geometrically, i.e., the sum of the voltage vectors/phasors cancel one another out or approximately cancel one another out (0V).

If the voltages/voltage vectors are each determined by magnitude (length) and angle (degrees of freedom), then the corresponding interconnection of the three phases in the three-phase system influences their magnitudes and/or angular relationships, As a result, given a corresponding interconnection (tapping), the angle closure of the voltage phasor system is realized (two independent or here independently adjustable degrees of freedom), angular relationships of the voltage vectors are adjusted to produce the independence thereof in terms of magnitude, or magnitudes of the voltage vectors are adjusted to produce the independence thereof in terms of angle.

In other words, the three-phase system offers two degrees of freedom, adjustable via the interconnection (tapping), which are advantageously utilized, here.

In this regard, in the case of EP 2 234 259 A1, in contrast to the foregoing, the angular relationship of the voltage vectors of the single-phase systems therein was fundamentally 180° and invariable, and only the magnitudes of the voltage vectors could be changed.

The use of the three-phase system in accordance with the invention for feeding electrical energy to the thin rods comprising the electrically conductive material, i.e., the thin silicon rods, can also be implemented as a corresponding circuit arrangement (for feeding electrical energy to the thin rods composed of electrically conductive material, i.e., thin silicon rods, and/or for igniting the rods) in which the three phases of the three-phase system, using corresponding components or circuit components/elements are interconnected or controlled such that the voltages (voltage vectors) of the three phases cancel one another out or at least approximately, i.e., apart from small voltage differences, (vectorially) cancel one another out (voltage difference is "ideally" zero (0V)) (three-phase closed vector triangle).

By means of the circuit arrangement, with the voltages mutually canceling one another out, the thin rods comprising of electrically conductive material, in particular the thin silicon rods, are then fed with electrical energy, and can thus subsequently be heated and ignited.

For such a circuit arrangement for producing the three-phase closed vector triangle, a three-phase transformer having three legs is suitable, in particular, which consists of one, preferably two or more three-phase systems on the secondary side and has a delta or star winding, preferably a delta winding, on the primary side.

The secondary-side three-phase system of the three-phase transformer is interconnected such that the respective voltages/voltage vectors of the three phases form the closed triangle system.

With the voltages, which mutually cancel one another out, the thin rods comprising the electrically conductive material, i.e., the thin silicon rods, are fed with electrical energy, and can thus subsequently be heated and ignited.

The circuit arrangement in accordance with the invention provides a three-phase transformer having a primary side and a secondary side. The primary side ("on the primary side") and secondary side ("on the secondary side") of the three-phase transformer have corresponding primary and secondary windings respectively (also designated simply as "primary winding" and "secondary winding", respectively).

On the primary side, the three-phase transformer can have a delta winding/connection or a star winding/connection. Put differently, the windings of the primary side or the primary windings/primary winding can be interconnected with one another such that a delta connection or a star connection is realized.

Preferably, a delta connection is realized on the primary side in the three-phase transformer, and so (in a manner governed by the configuration) in a transformer lamination of the three-phase transformer magnetic fluxes are established which make it easier (also temporarily) to produce a closed vector system on the secondary side.

Provision can also be made for the three-phase transformer to be connected on the primary side to a polyphase or three-phase voltage supply system (i.e., a feeding system) having, for example, an AC voltage in the range from 400 V-690 V. In other words, the primary windings can each be interconnected with a phase of the polyphase/three-phase voltage supply system. Such a feeding system is preferably a public power supply/electricity supply network (i.e., a feeding network).

In order to be able to realize a frequency of the feeding system independently of a feeding network present, such as the public electricity supply network, a frequency converter can be connected between feeding network and three-phase transformer. The structural size and losses of the three-phase transformer can thereby be minimized.

Moreover, a tapping or primary-side tappings in the three-phase transformer and/or an adaptation of an output voltage of the frequency converter, which is connected upstream of the three-phase transformer, can be provided in order to adapt the three-phase transformer on the secondary side (with respect to its voltages (i.e., its power output)).

On the secondary side, in the three-phase transformer the windings or the secondary windings/secondary winding are/is interconnected (tappings, i.e., generally interconnections between windings) with one another such that the sum of their voltage vectors (secondary voltage vectors, tapping voltage vectors/tapping voltages), i.e., the voltages/voltage vectors in/at the tappings, cancel one another out or at least approximately, i.e., apart from small voltage differences, cancel one another out (secondary voltage difference is "ideally" zero (0V)).

If, on the secondary side, the three-phase transformer has three winding phases corresponding to the three phases in the secondary windings, then these three winding phases are interconnected (tappings) with one another such that or in this way where the sum of their (three) (tapping) voltage vectors (secondary voltage vectors, tapping voltages) cancel one another out or at least approximately, i.e., apart from small voltage differences, cancel one another out (secondary voltage difference is "ideally" zero (0V)). Expressed briefly with simplified wording, on the secondary side the three winding phases or phases are interconnected with one another, where the sum of their (three) (tapping) voltage vectors (secondary voltage vectors, tapping voltages) cancel one another out.

In other words, the tapping voltages in/at the tappings produce a secondary voltage phasor system of the three-phase transformer, which system is (vectorially geometrically) closed or approximately closed ("ideally closed").

To put it another way illustratively as well, on the secondary side, via the tappings, a "triangle system" is realized, the "voltage legs" of which are fed such that the voltage phasors/vectors close geometrically, i.e., the sum of the (secondary) voltage vectors/phasors cancel one another out or approximately cancel one another out (0V).

If the voltage vectors are each determined by magnitude (length) and angle (degrees of freedom), then the corresponding interconnection (tapping) of the secondary winding/secondary windings in the three-phase transformer influences their magnitudes and/or angular relationships. As a result, given corresponding interconnection (tapping), the angle closure of the secondary voltage phasor system is realized (two independent or here independently adjustable degrees of freedom—angular relationships of the voltage vectors are adjusted to produce the independence thereof in terms of magnitude, or magnitudes of the voltage vectors are adjusted to produce the independence thereof in terms of angle).

In other words, the three-phase transformer offers with its secondary three-phase system two degrees of freedom, adjustable via the interconnection (tapping), which are advantageously utilized here.

In this regard, in the case of EP 2 234 259 A1, in contrast to the foregoing, the angular relationship of the voltage vectors of the single-phase systems therein was fundamentally 180° and invariable, and only the magnitudes of the voltage vectors could be changed.

On the secondary side, in the three-phase transformer, it is also possible to realize a plurality of (secondary) winding systems (angular displacements of not equal to 0° or 180° can be realized as a result), in particular also with different winding dimensionings (e.g., different winding cross sections), i.e., as three winding phases representing the three phases.

This secondary-side winding system (if appropriate comprising a plurality of secondary winding systems) can preferably be wound as a zigzag system. Here, in particular, windings of a respective winding phase of a three-phase secondary winding system can then be wound across different legs of the three-phase transformer.

Preferably, on the secondary side, in the three-phase generator, at least two winding systems (at least a first and a second secondary winding system, with further preference having different winding dimensioning (two voltage stages)) are realized.

If the secondary winding system is based/consists in particular on/of a plurality of secondary winding systems, then precisely as a result of this it is possible to construct a secondary-side winding system in which an individual tapping voltage vector is adjustable (by changeover of the tappings) such that the magnitude of the other tapping voltage vectors does not change, or changes to an extent advantageous for the task, without the (vectorially) closed secondary voltage phasor system or (vectorially) closed triangle system being opened.

If, via the tappings realized on the secondary side of the three-phase transformer (tapping voltages arising there) thin rods comprising the electrically conductive material, i.e., thin silicon rods, are fed or connected thereto, then medium voltage (feed voltage) (tapping voltage), canceling one another out, of appropriate magnitude, such as medium voltage in the range of 6 kV-8 kV, can be fed to the thin silicon rods, and the thin silicon rods can thereby be heated and finally ignited.

By means of the interconnection, variable for example by means of (semiconductor) switches, of the secondary-side winding system (secondary three-phase system), via the number of secondary-side winding systems and/or via the configuration of the winding dimensioning/windings, the tapping voltage or the (respective) tapping voltages can be adjusted or adapted or varied (according to its/their level without "opening" the vectorially closed triangle system).

With the adjustable/adaptable (tapping) voltages of the triangle system that mutually cancel one another out (voltage legs of the triangle system that (vectorially) mutually cancel one another out), the thin rods are fed, heated and thereby ignited.

Varying state conditions of the thin rods/thin silicon rods (feed conditions), such as a temperature-dependent change in an electrical conductivity in the thin rods/thin silicon rods (during an ignition phase or an ignition process), can thereby be taken into account.

Preferably, based on secondary-side load currents, the tapping voltages of the thin rods/thin silicon rods should be selected/adapted or switched in such a way so as to ensure as far as possible simultaneous ignition and uniform heating of the thin rods/thin silicon rods.

The tappings in all three winding phases of a secondary winding system having three winding phases can be arranged in each case symmetrically with respect to one another. The number of tappings can be selected from economic and/or technical standpoints.

The feeding of the thin rods/thin silicon rods (with a feed voltage) can preferably also be effected "indirectly" by virtue of a or a respective further transformer being connected upstream of the thin rods or a or a respective further transformer being connected between the respective secondary-side tapping and the thin rod/thin silicon rod (directly: tapping voltage is directly the "feed voltage" that feeds the thin rods, whereas indirectly: tapping voltage is transformed (stepped-up) via a further transformer to form the "feed voltage" that feeds the thin rods). It is thus possible to minimize costs, with higher costs otherwise necessary for technical reasons appertaining to insulation.

This "indirect feeding" of the thin rods, by the feed voltage generated by (step-up) transformation of the three-phase transformer tapping voltage, can preferably be realized in the form of a separate, appropriately embodied three-phase (auxiliary three-phase) transformer, where the three-phase transformer (as main transformer in that case) can thus be realized as a low-voltage transformer (for example, highest voltage stage<1 kV), whereas in that case the voltage is stepped up to the feed medium voltage (for example, medium feed voltages in the range of 6 kV-8 kV) by the auxiliary transformer.

Moreover, the "indirect feeding" can be realized by separate single-phase transformers (auxiliary transformers) connected upstream of the thin rods/thin silicon rods. The auxiliary transformers should be configured according to the power to be transferred, currents, a voltage to be insulated or a feed frequency.

When considered in a simplified way or illustratively, the secondary "triangle system", which is to feed the thin rods, of the three-phase transformer (triangle system comprising the tapping voltage vectors) is extended centrally to the triangle system comprising the "feed voltages/feed voltage vectors", such as from (low) voltages of less than 1 kV to (medium) voltages in the range of 6 kV-8 kV.

In particular, it is also advantageous to make the interconnection (tapping) switchable (in a controlled manner) or interconnection points (tapping points/locations) variable on the secondary side or in the secondary winding system ("changeover of secondary-side voltage stages"), in order thus to vary the (vectorially) closed triangle system (without "opening" the latter) in terms of form and position, such as via thyristor switches or other semiconductor switches. The changeover can preferably also be realized with contacts.

As a result, the voltage legs of the triangle system that (vectorially) mutually cancel one another out can be varied in terms of magnitude independently of one another, and it is thus possible to fulfill the altered feed conditions in the thin rods/thin silicon rods (change in resistance in the thin rods/thin silicon rods on account of the heating thereof), via correspondingly altered (increased/decreased) tapping voltages or feed voltages for the thin rods/thin silicon rods.

The circuit arrangement in accordance with the invention makes it possible (in this way), largely with the use of standard components (of a three-phase transformer, although used/interconnected differently/oppositely from/to "its" normal prescribed use) and thus in a simple and cost-effective manner, to ignite thin silicon rods/thin rods in a number of (silicon) thin rods to be ignited that deviates from four rods or an even number of rods.

In particular, three or a multiple of three (silicon) thin rods can be ignited and heated via the circuit arrangement (in the case of a multiple then as a circuit arrangement with a central three-phase transformer).

If just such a number of (silicon) thin rods can be arranged in an optimized manner (thermally/electrically) (optimized mutual heating with minimized heat emission toward the "outside"), a reactor that is spherical or spherical in sections, where the reactor accommodates three or a multiple of three (silicon) thin rods, attains here "its" corresponding electrical-mechanical optimum, i.e., a minimum reactor surface area with maximum reactor volume, minimized insulation requirements and minimized heat losses via the reactor wall.

If the intention is to ignite a multiple of each of three thin rods/thin silicon rods, then the central three-phase transformer can be controlled such that the individual "systems" each consisting of three thin rods/thin silicon rods are ignited successively. For this purpose, step switches for the individual systems should be driven in a suitable manner.

Here, the thin rods/thin silicon rods can also be formed as a rod pair, connected to form a (thin) rod.

In a preferred embodiment, the secondary-side winding system in the three-phase transformer is realized, for example, via correspondingly configured winding cross sections (winding dimensioning) and/or the number of secondary-side winding systems and/or via, for example, the interconnection (tapping), such as switchable interconnection points/tappings "within" a winding, such that the three-phase transformer can make available on the secondary side (at tapping points at this location), a low/medium voltage, such as greater than 400V, i.e., greater than 600V, for example, approximately 690V (three-phase transformer here as low-voltage transformer, indirect feeding) or in a range of 6 kV to 8 kV (three-phase transformer here as medium-voltage transformer, direct feeding).

In particular, what is achievable via different secondary-side winding dimensionings in the case of a plurality of winding systems on the secondary side or by the different configurations thereof is that feed voltages of different magnitudes can be fed to the thin rods/thin silicon rods, without the closed secondary-side triangle system "opening".

If, for example, a thin rod/silicon rod has thus ignited, its feed voltage can be reduced and/or the feed voltages of the other un-ignited thin rods/thin silicon rods can receive a voltage that is advantageously higher for the ignition process, without the vector triangle having to "open".

In accordance with a further preferred embodiment, the three-phase transformer is a three-phase transformer having two secondary winding systems, i.e, a Dz0 three-phase transformer having two secondary windings (standardized special configuration).

By means of further secondary-side winding systems in the three-phase transformer, it is possible to produce angular displacements with respect to the driving system of not equal to zero (Dz . . . ).

In this way, it is possible, as also with the possibly different winding dimensionings in the case of the plurality of winding systems on the secondary side, to adjust an individual secondary-side voltage vector such that the magnitude of the other two (secondary-side) voltage vectors (of the closed triangle system) does not change, or changes to an extent advantageous for the task (tapping voltage or feed voltage for the thin rods/thin silicon rods).

In particular, that is advantageous for the ignition process for the thin rods/thin silicon rods in which or if there one of the thin rods/thin silicon rods has ignited, heats up and thereby reduces its resistance in accordance with an NTC thermistor.

In order to reduce the heating rate of the ignited thin rod/thin silicon rod, the feed voltage for/at this thin rod/thin silicon rod can be reduced, without the feed voltages at the as yet un-ignited thin rods/thin silicon rods being reduced.

In accordance with a further preferred embodiment, in order to change over the secondary-side voltage stages (changeover switches of the tappings), the primary-side feeding of the three-phase transformer by an electricity supply network is interrupted, such as using a disconnecting switch, the secondary-side changeover is performed, such as for an adaptation of the feed voltage during the ignition phase, and the three-phase transformer is then connected to the electricity supply network again.

If a thin rod/thin silicon rod is heated from an ambient temperature to process temperature, then its power consumption (surface power output) increases with its temperature. For a constant power supply, on account of the NTC thermistor property of the thin rod/thin silicon rod material, in the cooled state a high voltage is established in the case of a small current, or at high temperatures a small voltage is established in the case of high currents.

By virtue of this property of the thin rods/thin silicon rods, the winding cross sections of the secondary-side winding system of the three-phase transformer can be configured advantageously (in a correspondingly adapted manner). In this regard, for example, secondary-side voltage/winding systems that are operated only at high voltages can be wound with smaller winding cross sections.

Furthermore, it is advantageous that the material of the three-phase transformer (iron or ferrite) that is required for transferring the magnetic fluxes has to be configured only according to the maximum power to be transferred.

A further preferred embodiment provides for feeding the thin rods/thin silicon rods in the operating state, i.e., after their ignition, via a different polyphase or three-phase power supply system (PPU).

In this case, a (main) controller, such as a single-phase AC controller, can also be provided for the PPU.

A switch is suitable at feed frequencies of 50/60 Hz, where at feed frequencies of >>50 Hz to protect the main controller, a damping RC snubber having no effect at 50 Hz can be advantageous.

In an alternative embodiment, a low-inductance transductor provides a further possibility to protect the main controller.

It is also possible to use (matching) switches for turn-off or, if suitable switches are used, also for disconnecting a line connection from the three-phase transformer to the auxiliary transformer(s).

Preferably, the circuit arrangement has one or a plurality of control device, i.e., one (or a plurality of) freely programmable controller(s), which realize "requirement-conforming" driving of the secondary-side inter-connection/tapping, of secondary-side switches, i.e., semiconductor switches, such as thyristors (matching) switching elements, (power) controllers or (power) contactors, and/or of the primary-side tapping, of primary-side switches, i.e., semiconductor switches, such as thyristors, switching elements, (power) controllers, or (power) contactors.

In particular, a freely programmable controller, based on measurement signals, can decide on an ignition strategy/heating strategy/operating strategy, and correspondingly control switching actions in a result-related manner.

For detecting measurement signals, the circuit arrangement can have a current detecting device and/or voltage detecting device to detect the current and/or the voltage (on the primary side and/or on the secondary side in the three-phase transformer).

In particular for detecting a "compensation voltage" that arises as a result of unbalances (no closed vector triangle), it is possible to provide a (differential) current detection with the aid of the high-voltage resistor.

The current and voltage detecting devices can be connected to the one or more control device of the circuit arrangement.

One preferred embodiment can also provide for a frequency converter to be connected between the feeding network and the three-phase transformer, in order to realize a frequency of the feeding system independently of a feeding network present, such as the public electricity supply network. Such a feeding system, which can be regulated in terms of its output voltage and frequency (feeding network with frequency converter) can also be driven such that a "non-closed" secondary voltage phasor system, can be identified in a timely manner before a resultant differential voltage exceeds a limit value.

The description of advantageous configurations of the invention as given above contains numerous features which are reproduced in part in a manner combined as a plurality in the individual dependent claims. However, a person skilled in the art will expediently also consider these features individually and combine them to form expedient further combinations.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and also its configuration and advantages are explained in greater detail below based on an exemplary embodiment with reference to figures.

Lines (solid, and also dashed) between elements as illustrated in the figures identify functional, logical and/or physical connections, such as electrical signal or data lines, for example, between the elements via which signals, data, and the like can be transferred or exchanged between the elements.

Figure 1:
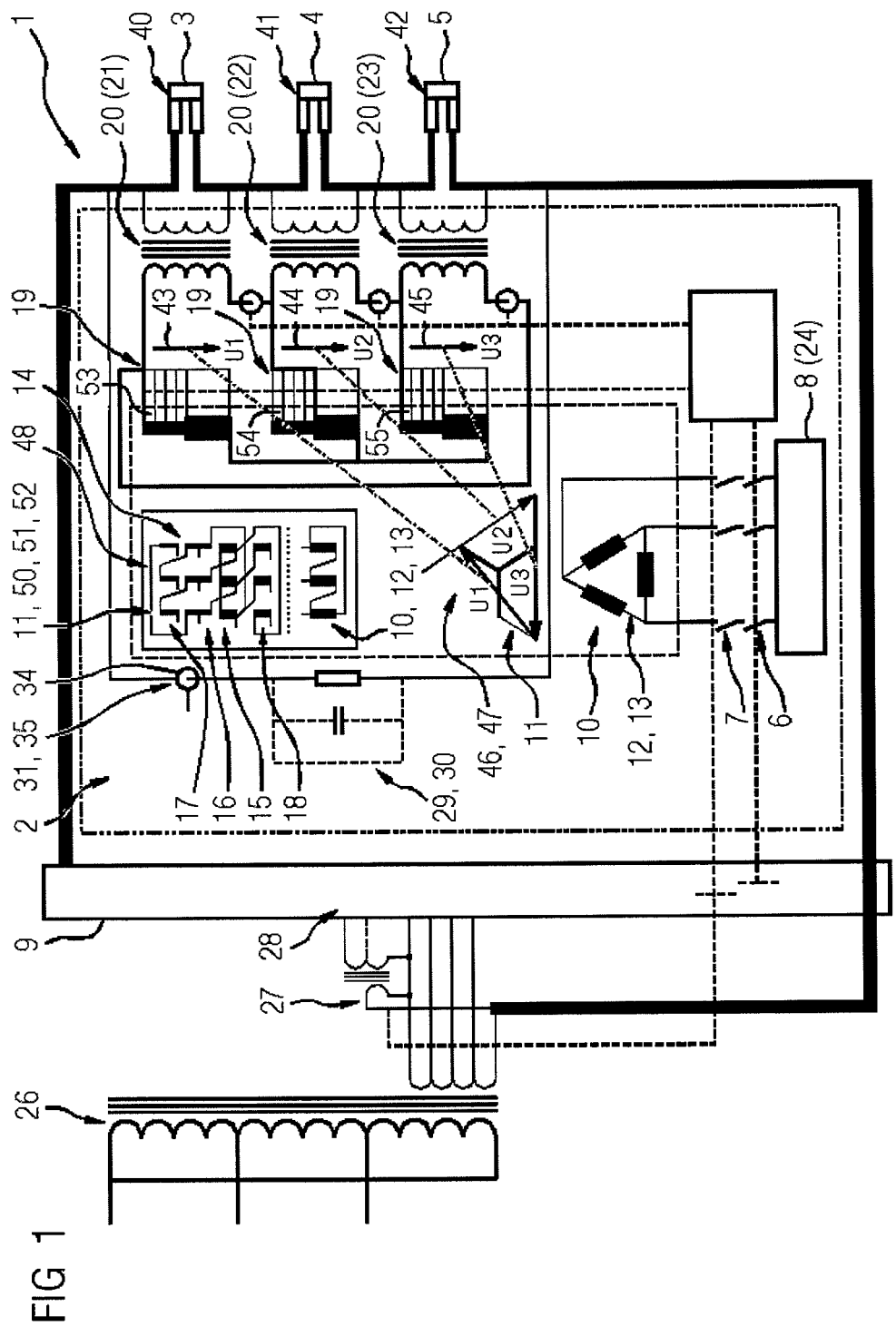
Figure 2:
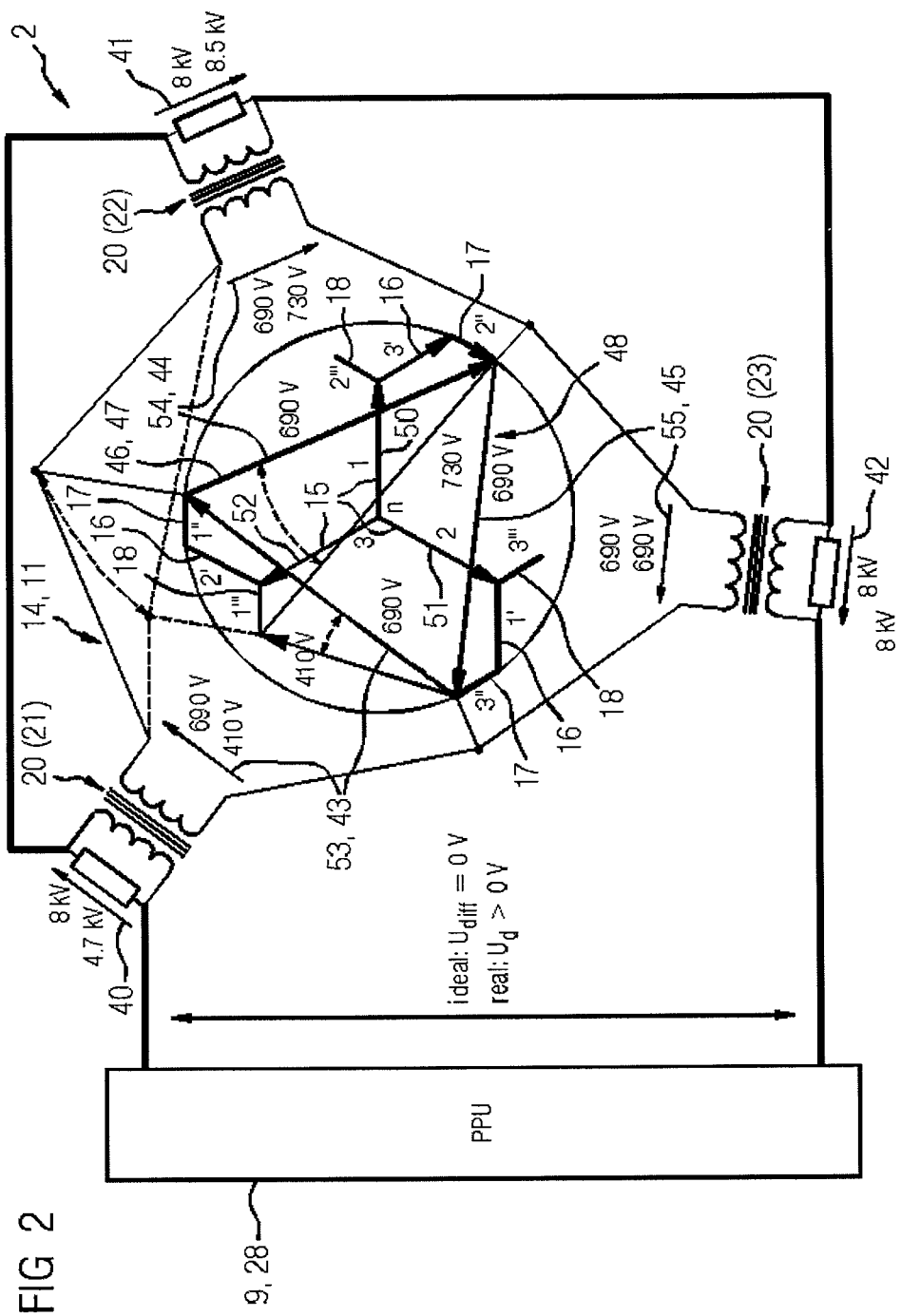
Figure 3:
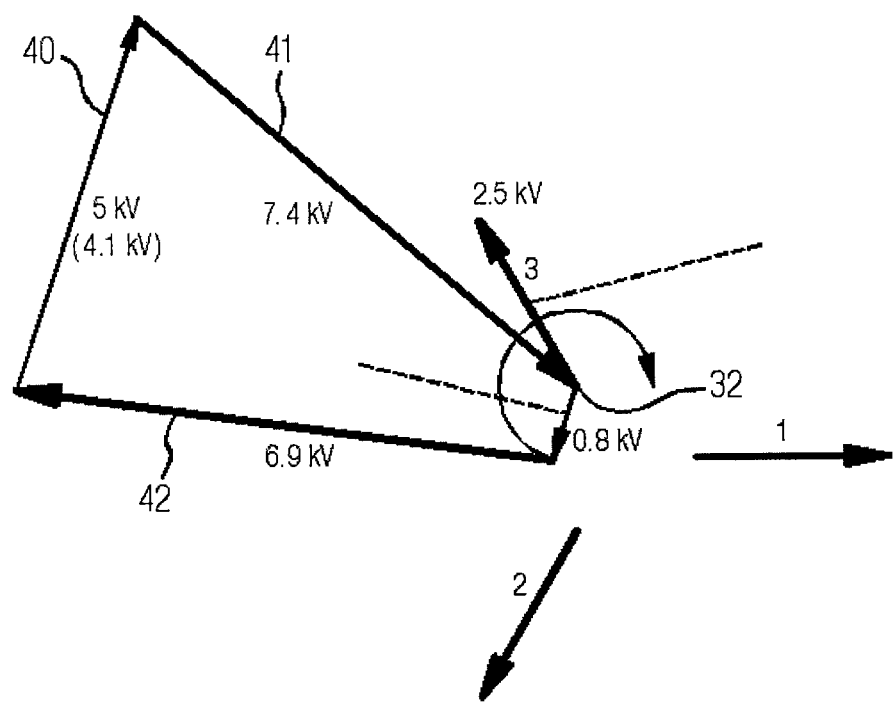
Figure 5:
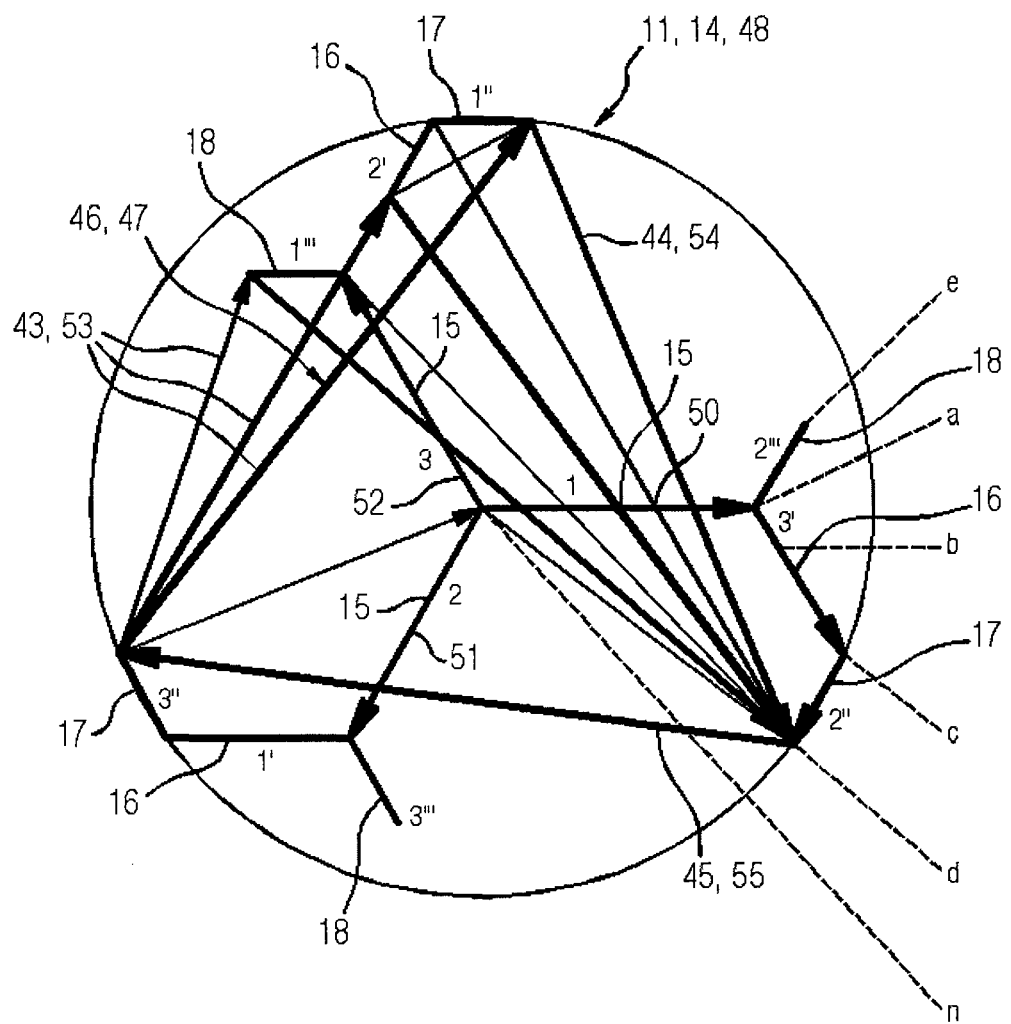

Identical or functionally identical component parts have identical reference signs in the figures, in which:

FIG. 1 shows a circuit diagram of a circuit arrangement comprising a three-phase transformer for igniting thin silicon rods in accordance with an embodiment of the invention;

FIG. 2 shows an angle diagram (phasor diagram) of the circuit arrangement of FIG. 1;

FIG. 3 shows an angle diagram (phasor diagram) of a voltage stage that supplies the thin silicon rods with medium voltage in the circuit arrangement of FIG. 1;

FIG. 4 shows a circuit diagram of the three-phase transformer of the circuit arrangement of FIG. 1; and FIG. 5 shows an angle diagram (phasor diagram) with regard to the three-phase transformer of the circuit arrangement of FIG. 1 or the circuit diagram of FIG. 4.

DETAILED DESCRIPTION OF THE PREFERRED EMBODIMENTS

Circuit arrangement for igniting three or a multiple of in each case three thin silicon rods in a reactor for producing silicon rods from the thin silicon rods according to the Siemens process.

FIG. 1 shows a circuit diagram of a circuit arrangement 1 comprising a three-phase transformer 2 for igniting (shown here for three) thin silicon rods 3, 4, 5. FIG. 2 shows the associated (voltage vector) angle/phasor diagram of the circuit arrangement 1 or of the three-phase transformer 2 of the circuit arrangement 1.

FIG. 4 and FIG. 5 show, with the circuit diagram and angle/phasor diagram respectively therein, the three-phase transformer 2 of the circuit arrangement 1 once again in detail.

The circuit arrangement 1 for igniting the thin silicon rods 3, 4, 5 is connected, as shown in FIG. 1, via a disconnecting switch 6 and an operating switch 7 to a three-phase voltage supply network 8 (feeding network, here public electricity supply network), which feeds three-phase current or AC voltage at a level of approximately 400 kV to the circuit arrangement 1 (in a start phase).

The circuit arrangement 1 serves to ignite the thin silicon rods 3, 4, 5 (electrically) and to run up (start phase) the reactor (not illustrated) in which the thin silicon rods 3, 4, 5, in the form of (in this case) three thin rod pairs, are arranged.

Once this start phase has ended, i.e., the thin silicon rods 3, 4, 5 have ignited and the reactor (not illustrated) has run up, the voltage supply of the thin silicon rods 3, 4, 5 (for producing polycrystalline silicon rods from the thin silicon rods 3, 4, 5) is taken over by a different AC source 9, designated here as PPU 9, i.e., by a single-phase AC controller 9 fed by a medium-voltage network (not illustrated) via a main transformer 26 in combination with an auxiliary transformer 27 (operating phase).

Various voltage/transformer stages in the auxiliary transformer 27 are switchable via controllable semiconductor switches or thyristors 28, as a result of which the PPU 9 is able to feed AC voltage (adjustable in a controlled manner) in a range of 1 kV to 2.5 kV to the thin silicon rods 3, 4, 5 in the operating phase.

For protecting the single-phase main AC controller or the PPU 9, a switch 29 is provided, at feed frequencies of 50/60 Hz, or a damping RC snubber 30 having no effect at 50 Hz is provided, at feed frequencies of >>50 Hz.

For supplying the thin silicon rods 3, 4, 5 during the start phase (ignition, run-up), the circuit arrangement 1 feeds medium voltage (adjustable in a controllable manner) in the range of approximately 6 kV to 8 kV to the thin silicon rods, said medium voltage being produced by (controlled) "step-up transformation" of the three-phase network AC voltage from the three-phase voltage supply network 8 via the circuit arrangement 1, and being made available to the thin silicon rods 3, 4, 5. In the operating phase, medium voltage of up to 2.5 kV is fed to the thin silicon rods 3, 4, 5 via the PPU 9.

On the primary side 10, the three-phase transformer 2, having three legs, has a delta winding/connection 12 (D . . . ), i.e., the windings 13 of the primary side 10 or the primary winding 13 are or is, as shown in FIGS. 1, 4, 5, interconnected with one another such that the delta connection 12 is realized.

On the secondary side 11, as illustrated or shown in FIGS. 1, 2, 4, 5, the three-phase transformer 2 is wound as a zigzag connection/winding 48 with a secondary winding system 14, comprising a plurality of winding systems 15, 16, 17, 18 each differing in terms of their winding dimensions (e.g. different winding cross sections), i.e., a first secondary winding system 15 (first voltage/transformer stage), a second secondary winding system 16 (second voltage/transformer stage), a third secondary winding system 17 (third voltage/transformer stage) and a fourth secondary winding system 18 (fourth voltage/transformer stage).

As shown in FIGS. 1, 2, 4 and 5, in the secondary winding system 14 or as a result of corresponding interconnection of the four secondary winding systems 15, 16, 17, 18, three (winding) phases 50, 51, 52 (corresponding to the three phases) with respectively four voltage stages, in accordance with the four secondary winding systems 15, 16, 17, 18, are realized.

As illustrated in FIGS. 1, 2, 4, 5, the first winding phase 50, proceeding from the star point n, connects a winding W11 (nomenclature Wxy according to: W: winding; x: number of the leg [1-3] of the three-phase transformer 2 having three legs; y: number of the secondary winding system (voltage stage) [1-4]; through-flow directions are illustrated by arrows x, x', x", x''' (x: number of the leg; '/"/''': second/third/fourth secondary winding system 16, 17, 18)) of the first secondary winding system 15 to a winding W32 of the second secondary winding system 16 and further to a winding W23 of the third secondary winding system 17. A winding W24 of the fourth secondary winding system 18 is connected to the first winding phase 50 downstream of the winding W11 (and upstream of the winding W32).

As illustrated in FIGS. 1, 2, 4, 5, the second winding phase 51 leads from the star point n via a winding W21 of the first secondary winding system 15, further via a winding W12 of the second secondary winding system 16 to a winding W33 of the third secondary winding system 17. A winding W34 of the fourth secondary winding system 18 is connected to the second winding phase 51 downstream of the winding W21 (and upstream of the winding W12).

As illustrated in FIGS. 1, 2, 4, 5, the third winding phase 53 runs from the star point n via a winding W31 of the first secondary winding system 15, further via a winding W22 of the second secondary winding system 16 to a winding W13 of the third secondary winding system 17. A winding W14 of the fourth secondary winding system 18 is connected to the third winding phase 52 downstream of the winding W31 (and upstream of the winding W22).

Via a plurality of tappings 53 at the first winding phase 50 and tappings 54 at the second winding phase 51 and tappings 54 at the third winding phase 52, said tappings being switchable by means of electrical switches/contactors 19 or thyristors 19, tapping voltages/output voltages 43 and 44 and 45 respectively (with different voltage magnitudes and phase angles (adjustable for a respective ignition state of a silicon rod 3, 4, 5)) can be tapped off at the winding phases 50, 51, 52.

In this case, as illustrated in FIGS. 1, 2, 5, the secondary winding system 14 ensures that the tapping voltages/output voltages 43 and 44 and 45 that can respectively be tapped off at the phases 50, 51, 52, i.e., their (tapping/output) voltage vectors 43, 44, 45, form a closed triangle system 46 or a (closed) secondary voltage phasor system 47.

In other words, the three-phase transformer 2 realizes on the secondary side 11 a (vectorially) closed secondary voltage phasor system 47 or a (vectorially) closed vector triangle 46 in the case of the output voltages 43, 44, 45 (correspondingly also in this way in the case of feed voltages 40, 41, 42 for the thin silicon rods).

In other words, on the secondary side 11 in the three-phase transformer 2, the circuit arrangement 1 realizes a "triangle system" 46, the "voltage legs" of which are fed such that the voltage phasors/vectors 43, 44, 45 geometrically close, i.e., the sum of the (secondary) voltage vectors/phasors 43, 44, 45 cancel one another out here or approximately cancel one another out here (0V).

If the secondary winding system 14 of the three-phase transformer 2 provides, depending on the tapping 53, 54, 55 or voltage stage (determined via the winding dimensionings and the number of secondary winding systems 15, 16, 17, 18), (low) voltages (i.e., the "output voltages" 43, 44, 45), in the range of less than 1 kV, (highest voltage stage of the three-phase transformer 2 less than 1 kV), these voltages, as illustrated in FIG. 1, are stepped up via a three-phase auxiliary transformer 20 of the circuit arrangement 1 to the thin silicon rod feed voltages 40, 41, 42, in the medium-voltage range of approximately 6 kV-8 kV, required for ignition.

If the output voltages 43, 44, 45 or their (output) voltage vectors 43, 44, 45 formed the (vectorially) closed secondary voltage phasor system 47 or a (vectorially) closed vector triangle (triangle system) 46, then the feed voltages 40, 41, 42 also form, in a manner stepped up correspondingly, such a (vectorially) closed secondary voltage phasor system 47 or (vectorially) closed vector triangle (triangle system) 46.

The feed voltages 40, 41, 42, "mutually canceling one another out", are fed to the thin silicon rods 3, 4, 5, and the thin silicon rods 3, 4, 5 are thereby heated and ignited.

If the secondary winding system 14 is based on an interconnection of a plurality of secondary winding systems 15, 16, 17, 18, then it is possible to produce angular displacements with respect to the driving system of not equal to zero (Dz . . . )—without the (vectorially) closed secondary voltage phasor system 47 or (vectorially) closed vector triangle (triangle system) 46 being opened.

In particular, via the fourth secondary winding system 18, i.e., via the windings W14, W24, W34 in the winding phases 50, 51, 52 or via the interconnection and winding dimensioning thereof, or via a tapping connected (changed over) on one of the windings W14, W24, W34 of the secondary winding system 18, it is possible to adjust an individual output voltage/output voltage vector 43, 44, 45 (and thus also an individual feed voltage/feed voltage vector 40, 41, 42) (by changing over the tappings 53, 54, 55) such that the magnitude of the other two output voltages/output voltage vectors 43, 44, 45 (and thus also feed voltages/feed voltage vectors 40, 41, 42) does not change, or changes to an extent advantageous for the task, without the (vectorially) closed secondary voltage phasor system 47 or (vectorially) closed vector triangle (triangle system) 46 being opened.

If, as illustrated in FIGS. 2, 5, during the ignition process, one of the three thin silicon rods, here thin silicon rod 3, has thus ignited, heated up and thereby reduced its resistance in accordance with an NTC thermistor, then it is possible, in order to reduce the heating rate of this ignited thin silicon rod 3, by changing over the tapping 53 from the winding W13 of the third secondary winding system 17 to the winding W14 of the fourth secondary winding system 18 in the phase 50, for the output voltage 43 at this ignited thin silicon rod 3 to be reduced (here reduction of the output voltage 43 from, for example, 690 V to 410 V or as a consequence (of the step-up transformation by the auxiliary transformer 20) reduction of the feed voltage 40 from 8 kV to 4.7 kV), without reducing the output voltages 44, 45 or the feed voltages 41, 42 at the as yet un-ignited thin silicon rods 4, 5 (slight increase in the output voltage 44 from 690 V to 730 V or slight increase in the feed voltage 41 from 8 kV to 8.5 kV of thin silicon rod 4; output voltage 45 and feed voltage 42 of thin silicon rod 5 remain unchanged), and without the (vectorially) closed secondary voltage phasor system 47 or (vectorially) closed vector triangle (triangle system) 46 being opened.

A freely programmable controller 33 decides, based on measurement signals, on the ignition strategy, the output voltages 43, 44, 45, the feed voltages 40, 41, 42, and controls the switching actions accordingly in a result-related manner via the semiconductor switches 19, thyristors 19, or the tappings x.

In this regard, for example, the output voltages 43, 44, 45 or the feed voltages 40, 41, 42 of the thin silicon rods 3, 4, 5 are controlled so as to ensure as far as possible simultaneous ignition and uniform heating of the thin silicon rods 3, 4, 5. Once the thin silicon rods 3, 4, 5 have ignited, the line connections of the three-phase transformer 2 to the auxiliary transformer 20 are disconnected and the thin silicon rods are operated/fed via/by the PPU 9. Output voltages 43, 44, 45 or feed voltages 40, 41, 42 can be controlled during the ignition process/in the ignition phase such that they are each reduced for ignited thin silicon rods, or else they are then each kept constant or slightly increased for the un-ignited thin silicon rods.

For detecting the measurement signals, the circuit arrangement 1 provides current detecting device 34 and/or voltage detecting device 34 in order to detect the current and/or the voltage (on the primary side 10 and/or on the secondary side 11 in the three-phase transformer 2). FIG. 1 shows such devices, for example, on the secondary side 11 in the secondary winding system 14 of the three-phase transformer 2.

Unbalances occurring in the three-phase transformer can lead to "compensation voltages" or "differential voltages", which can lead to slight openings in the (vectorially) closed secondary voltage phasor system 47 or the (vectorially) closed vector triangle 46 ("ideally closed").

For detecting such "compensation voltages"/"differential voltages" that arise as a result of unbalances (no closed vector triangle 46 or secondary voltage phasor system 47, "differential voltage", cf. FIG. 3), provision is made of differential-current detection by a current detecting device 34 with the aid of a high-voltage resistor 31.

FIG. 3 illustrates this "compensation voltage"/"differential voltage" by way of example—here then (in the case of a transformer stage of the PPU 9 of 2.9 kV) in the case of feed voltages 40, 41, 42 with a magnitude of 4.1 kV, 7.4 kV, 6.9 kV the "differential voltage" 32 with a magnitude of 0.9 kV—for the PPU 9.

Although the invention has been more specifically illustrated and described in detail by means of the preferred exemplary embodiments, the invention is nevertheless not restricted by the examples disclosed, and other variations can be derived therefrom by a person skilled in the art, without departing from the scope of protection of the invention.

Thus, while there have shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A circuit arrangement for igniting three thin silicon rods in a polycrystalline silicon production process, said circuit comprising:
   a three-phase transformer having a primary side for connection to a three-phase voltage supply system and a secondary side connected via auxiliary transformer means to the three thin silicon rods; and
   a controller;
   wherein the secondary-side of the three-phase transformer comprises a star or zig-zag connected secondary winding system having line-to-line voltages between phases of the secondary winding system;
   wherein the star or zig-zag connected secondary winding system comprises tapped windings within each phase of the star or zig-zag connected secondary winding system, each winding of said tapped windings being connected to the auxiliary transformer means via switches which are individually controllable by the controller;

wherein the auxiliary transformer means comprises three separate single-phase auxiliary transformers respectively connected between the phases of the star or zig-zag connected secondary winding system such that the line-to-line voltages provided to the auxiliary transformer means via the individually controllable switches form a three-phase closed vector triangle;

wherein the three separate single-phase auxiliary transformers feed the line-to-line voltages provided to the three thin silicon rods, respectively;

wherein the three thin silicon rods are connected in series to another AC power source which is configured to take over supplying voltage to the three thin silicon rods upon (i) ignition of the three thin silicon rods and (ii) disconnection of the auxiliary transformers from the star or zig-zag connected secondary winding system via the individually controllable switches.

2. The circuit arrangement of claim 1, wherein the three-phase transformer has one of (i) a delta-connected winding system on the primary side and (ii) a star-connected winding system on the primary side.

3. The circuit arrangement of claim 1, wherein the auxiliary transformer means further comprises a three-phase auxiliary transformer.

4. The circuit arrangement as claimed claim 1, wherein a frequency converter is connected between the three-phase voltage supply system and the three-phase transformer.

5. The circuit arrangement of claim 1, wherein the three-phase transformer comprises a low-voltage transformer; and wherein the auxiliary transformer means comprises a medium-voltage transformer means.

* * * * *